United States Patent
Ma et al.

[11] Patent Number: 6,117,921
[45] Date of Patent: *Sep. 12, 2000

[54] PROCESS FOR MAKING PRINTED IMAGES USING PIGMENTED INK JET COMPOSITIONS

[75] Inventors: Sheau-Hwa Ma, Chadds Ford, Pa.; Michael Fryd, Morrestown, N.J.

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/706,416

[22] Filed: Aug. 30, 1996

[51] Int. Cl.$^7$ .................................................. C09D 5/00
[52] U.S. Cl. .................................... 523/161; 524/533
[58] Field of Search ........................... 523/161; 524/533, 524/535; 525/296, 309, 310

[56] References Cited

U.S. PATENT DOCUMENTS

| | | | |
|---|---|---|---|
| 3,928,255 | 12/1975 | Milkovich | 525/62 |
| 4,085,168 | 4/1978 | Milkovich | 523/106 |
| 4,597,794 | 7/1986 | Ohta et al. | 106/20 |
| 5,085,698 | 2/1992 | Ma et al. | 106/20 |
| 5,231,131 | 7/1993 | Chu et al. | 524/504 |
| 5,589,522 | 12/1996 | Beach | 523/160 |
| 5,656,071 | 8/1997 | Kappele | 106/31.76 |
| 5,719,204 | 2/1998 | Beach | 523/161 |

FOREIGN PATENT DOCUMENTS

| | | |
|---|---|---|
| 0 556 649 | 8/1993 | European Pat. Off. . |
| 0 622 429 | 11/1994 | European Pat. Off. . |
| 0 722 994 | 7/1996 | European Pat. Off. . |
| 6-100810 | 4/1994 | Japan ............... C09D 11/00 |

*Primary Examiner*—Paul R. Michl
*Attorney, Agent, or Firm*—Joseph A. Tessari

[57] ABSTRACT

Dispersions of an aqueous carrier medium, an insoluble particle, and a graft copolymer dispersant having backbone and side chain portions wherein both portions are prepared from ethylenically unsaturated monomers and either the backbone or sidechain portion is hydrophilic and the other portion is hydrophobic. In a preferred embodiment, the dispersion is formulated as an ink that exhibits excellent resistance to flocculation and provides images with a high color strength and gloss when used in a thermal ink jet printer.

16 Claims, No Drawings

PROCESS FOR MAKING PRINTED IMAGES USING PIGMENTED INK JET COMPOSITIONS

FIELD OF THE INVENTION

This invention relates to dispersions having excellent stability and, more particularly, to aqueous pigmented inks for ink jet printers wherein the pigment dispersant is a graft copolymer.

BACKGROUND OF THE INVENTION

Ink jet printing is a non-impact process in which digital signals produce droplets of ink on substrates such as paper or transparency films. Pigments are preferred ink colorants due to their lightfastness and their potential to offer waterfastness and resistance to smear and smudge. The pigmented ink, however, must be stable to flocculation and settling throughout the life of the ink.

In thermal ink jet printing, resistive heating is used to vaporize the ink, which then is expelled through a printhead orifice onto a substrate. Composition of the ink changes dramatically during the process, which tends to cause pigment particles to flocculate in or near the printhead orifices. Ink drops may be misdirected as a result, and in extreme cases the orifices may become plugged.

The ink typically contains many organic additives (e.g., thickeners and thixotropic agents) to adjust its physical properties. Organic cosolvents generally are included to improve ink penetration into the printing substrate, and surfactants typically are added to decrease ink dry-time after printing. As the ink dries, concentration of these components increases, jeopardizing stability of the pigment dispersion that is necessary to obtain uniformity and color quality of the printed image.

Pigment dispersions generally are stabilized by either a non-ionic or ionic technique. When the non-ionic technique is used, the pigment particles are stabilized by a polymer having a hydrophilic section that extends into the water medium, providing entropic or steric stabilization. Polyvinyl alcohol, cellulosics, ethylene oxide modified phenols, and ethylene oxide/propylene oxide polymers may be used for this purpose. While the non-ionic technique is not sensitive to pH changes or ionic contamination, it has a major disadvantage in that the printed image is water sensitive.

In the ionic technique, the pigment particles are stabilized using the polymer of an ion containing monomer, such as neutralized acrylic, maleic, or vinyl sulfonic acid. The polymer provides stabilization through a charged double layer mechanism whereby ionic repulsion hinders the particles from flocculation. Since the neutralizing component tends to evaporate after printing, the polymer then has reduced water solubility and the printed image is not water sensitive.

Dispersants having random, block, and graft polymeric structures have been proposed in the art. U.S. Pat. No. 4,597,794 to Canon discloses aqueous ink dispersions wherein the pigment particles are dispersed using a polymer having ionic hydrophilic segments and aromatic hydrophobic segments that adhere to the pigment surfaces. U.S. Pat. No. 5,085,698 to DuPont discloses use of AB and BAB block polymer dispersants. Unexamined Japanese application JP6-100,810 to Canon discloses using certain graft copolymers having a hydrophilic portion containing acid groups and a hydrophobic portion primarily composed of styrenes and alkyl esters of meth(acrylic acid).

While random polymeric dispersants such as those proposed in U.S. Pat. No. 4,597,794 can be prepared readily using conventional polymerization techniques, structured polymeric dispersants such as those taught in U.S. Pat. No. 5,085,698 usually provide better dispersion stability. The structured polymers, however, are more difficult to manufacture and require raw materials having a high purity. The graft copolymers proposed in JP6-100,810 are prepared in an elaborate multi-step process generally requiring purification steps before the macromonomers can be used in the synthesis of the final graft copolymer.

Accordingly, there is an ongoing need for improved aqueous pigmented inks for ink jet printing using dispersants that are easily prepared and that provide excellent stability of the ink during the demanding conditions of ink jet printing.

SUMMARY OF THE INVENTION

It now has been found that certain graft copolymers are particularly useful as dispersants in formulating aqueous dispersions in general, and in formulating pigmented inks in particular. The copolymers are especially useful in formulating inks that satisfy the demanding requirements of thermal ink jet printing. Accordingly, the invention provides an aqueous dispersion containing:

(a) an aqueous carrier medium,
(b) an insoluble colorant, and
(c) a graft copolymer dispersant having a backbone portion and at least one sidechain portion wherein both portions are prepared from ethylenically unsaturated monomers and either the backbone or sidechain portion is hydrophilic and the other portion is hydrophobic, the hydrophobic portion containing at least 50% by weight, based on the total weight of the hydrophobic portion, of a monomer selected from the group consisting of aryl esters of acrylic acid, aryl esters of methacrylic acid, N-aryl acrylamide, N-aryl methacrylamide and vinyl aryl esters.

The aqueous dispersions offer broad compatibility with additives such as thickeners, latex emulsions, surfactants, etc. that may be desired for specific applications. In a preferred embodiment, the dispersion is formulated as an ink adapted for use in a thermal ink jet printer. Resulting inks are relatively forgiving to changes in the environmental conditions, such as firing conditions of thermal printers, that may be found in commercial applications. The printed images typically exhibit high color strength and gloss.

DETAILED DESCRIPTION OF THE INVENTION

While the aqueous dispersions of the invention may be used for other applications, such as air brush printing, they will now be described in detail with respect to applications for ink jet printers in general, and thermal ink jet printers in particular. The inks may be adapted to the requirements of a particular ink jet printer to provide a balance of light stability, smear resistance, viscosity, surface tension, optical density, and crust resistance.

AQUEOUS CARRIER MEDIUM

For ink jet inks, the aqueous carrier medium is typically a mixture of water and at least one water-miscible organic cosolvent. Some representative examples of water-miscible organic cosolvents are disclosed in U.S. Pat. No. 5,085,698. Selection of a particular mixture of water and water miscible organic solvent depends upon requirements of the specific application, such as desired surface tension and viscosity, the selected pigment or disperse dye, drying time of the ink, and the type of media substrate that will be printed. A mixture of diethylene glycol and deionized water is preferred as the aqueous carrier medium for ink jet inks, with the composition containing between 30% and 95%, preferably 60% to 95% water, by weight based on the total weight of the aqueous carrier medium.

The amount of aqueous carrier medium in the ink is in the range of approximately 70 to 99.8%, preferably 94 to 99.8%, based on the total weight of the ink, when an organic pigment is selected, approximately 25 to 99.8%, preferably 70 to 99.8%, when an inorganic pigment is selected; and 80 to 99.8% when a disperse dye is selected.

INSOLUBLE COLORANTS

The term "insoluble colorant" refers to colorants that are insoluble in the selected aqueous carrier medium, which may be a pigment or a disperse dye.

Pigment

The insoluble colorant typically is a pigment. Useful pigments include a wide variety of organic and inorganic pigments, alone or in combination. The selected pigment must be capable of binding with the hydrophobic portion of the graft copolymer. Preferably, the pigment has "binding sites" that bind with the polymer. Many commercially available pigments have very specific functional groups on their surfaces that serve this purpose. For example, all carbon blacks have chemisorbed oxygen complexes that are primarily acidic in nature (e.g. carboxylic, quinonic, lactonic or phenolic groups) on their surfaces. These acidic groups provide binding sites for dispersants having basic groups, such as amine.

Other pigments having acidic or basic groups on the pigment surface may be selected to advantage. These groups may inherently be present, or may be present due to a surface treatment of the pigment. Representative functional groups that may provide binding sites include sulfonic, phosphoric and carboxylic acid groups, and amine-type basic groups. Furthermore, most organic color pigments and many surface treatment compounds have aromatic groups that provide sites for additional dipole-dipole binding with the dispersant.

The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles helps prevent the particles from settling. It is also desirable to use small particles for maximum color strength. The range of useful particle sizes is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be selected are disclosed in U.S. Pat. No. 5,085,698.

Fine particles of metal or metal oxides also may be used. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but will generally be in the range of approximately 1 to 15%, preferably approximately 1 to 8%, by weight of the total ink composition for most thermal ink jet printing applications. If an inorganic pigment is selected, the ink will tend to contain higher weight percentages of the pigment than with comparable inks employing organic pigment, and may be as high as approximately 50% because inorganic pigments generally have higher specific gravities than the organic pigments.

Disperse Dyes

The color and amount of disperse dye used in the ink is largely a function of choice, being primarily dependent upon the desired color of the print achieved with the ink, the purity of the dye, and its strength. Low concentrations of dye may not give adequate color vividness. High concentrations may result in poor printhead performance or unacceptably dark colors. The disperse dye may be present in the amount of 0.01 to 20% by weight, preferably 0.05 to 8% by weight, more preferably 1 to 5% by weight, based on the total weight of the ink. Disperse dyes that may be useful in this invention are disclosed in U.S. Pat. No. 5,053,495; U.S. Pat. No. 5,203,912; and U.S. Pat. No. 5,102,448.

GRAFT COPOLYMER

The graft copolymer has a hydrophobic portion that binds with the insoluble colorant and a hydrophilic portion that is soluble in the aqueous carrier medium. The ratio of the hydrophobic portion to the hydrophilic portion is in the range of 90:10 to 10:90 by weight, and preferably from 80:20 to 50:50 by weight. The hydrophobic portion can be conveniently built in the backbone, with the hydrophilic portion concentrated in the sidechains, or the reverse.

The hydrophobic portion, either as the backbone or as the sidechain, is prepared from ethylenically unsaturated monomers and contains at least 50% by weight, based on the total weight of the hydrophobic portion, of at least one monomer selected from the group consisting of aryl esters of acrylic acid, aryl esters of methacrylic acid, N-aryl acrylamide, N-aryl methacrylamide and vinyl aryl esters. The term "aryl" as used herein includes substituted aryl, substituted alkylaryl, unsubstituted aryl, and unsubstituted alkylaryl groups. The monomers are characterized by the following formulae:

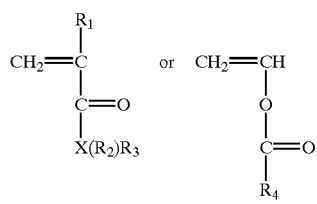

wherein $R_1$ is selected from the group of H and $CH_3$; X is selected from the group of N and O; when X is N, $R_2$ and $R_3$ may be independently selected from the group consisting of H, substituted alkyl, substituted aryl, substituted alkylaryl, unsubstituted alkyl, unsubstituted aryl and unsubstituted alkylaryl groups provided that either $R_2$ or $R_3$ contains at least one aryl or alkylaryl group; when X is O, $R_2$ does not exist and $R_3$ is selected from the group consisting of substituted aryl, substituted alkylaryl groups, unsubstituted aryl and unsubstituted alkylaryl groups; and $R_4$ is selected from the group consisting of substituted aryl, substituted alkylaryl groups, unsubstituted aryl and unsubstituted alkylaryl groups. The term "substituted" aryl or alkylaryl is used herein to mean an aryl group that contains one or more substituents that do not interfere with the polymerization process. For example, such substituents may be alkyl, hydroxy, amino, ester, acid, acyloxy, amide, nitrile, halogen, haloalkyl, alkoxy. Some examples of useful monomers are phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, 1-naphthalyl acrylate, 2-naphthalyl acrylate, 2-naphthalyl methacrylate, p-nitrophenyl acrylate, p-nitrophenyl methacrylate, phthalimidomethyl acrylate, phthalimidomethyl methacrylate, N-phenyl acrylamide, N-phenyl methacrylamide, N-benzyl acrylamide, N-benzyl methacrylamide,N-(2-phenylethyl) acrylamide, N-(2-phthalimidoethoxymethyl)acrylamide, vinyl benzoate, and the like.

The hydrophobic portion may contain other hydrophobic ethylenically unsaturated monomers to modify the physical properties of the dispersant polymer, such as glass transition temperature (Tg). Useful monomers include, for example, alkyl esters of acrylates or methacrylates, and N-alkyl substituted acrylamides or methacrylamides and vinyl alkyl esters. Some examples of such monomers include methyl acrylate, ethyl acrylate, n-butyl acrylate, 2-ethylhexyl acrylate, methyl methacrylate, ethyl methacrylate, n-butyl methacrylate, t-butyl methacrylate, 2-ethylhexyl methacrylate, cyclohexyl methacrylate, styrene, α-methyl styrene, vinyl acetate, vinyl butyrate, and the like. The hydrophobic portion may also contain up to 20% by weight, preferably 1 to 10% by weight, based on the total weight of the graft copolymer, of one or more hydrophilic monomers listed hereinafter. The hydrophobic portion may also contain up to 30% by weight, based on the total weight of the graft copolymer, of one or more monomer having functional groups that enhance the pigment binding force. For example, monomers with amine groups such as N,N-dimethylaminoethyl acrylate may be incorporated in the hydrophobic portion to facilitate binding with pigments having acidic groups on the surface. Monomers with acid groups such as 2-acrylamido-2-propane sulfonic acid may be incorporated in the hydrophobic portion for pigments with basic surfaces.

The hydrophilic portion, either as the backbone or as the sidechain, is prepared from ethylenically unsaturated monomers. It needs to be soluble in the selected aqueous carrier medium, and may contain 2 to 100%, preferably 20 to 90% by weight, based on the total weight of the hydrophilic portion, of monomers that are ionizable. The choice of the ionizable monomers depends on the desired ionic character of the ink for a selected application.

For an anionic graft copolymer dispersant, the ionizable monomers are primarily monomers having acid or acid precursor groups. Examples of useful monomers include acrylic acid, methacrylic acid, crotonic acid, itaconic acid, itaconic acid monoester, maleic acid, maleic acid monoester, fumaric acid, fumaric acid monoester, and the like. The acid groups on the monomers may be blocked for the polymerization processes that are sensitive to active hydrogens, such as anionic or group transfer polymerization. The blocking groups are removed after the polymerization. Some examples of blocked monomers that generate acrylic or methacrylic acid after removal of the blocking group include trimethylsilyl acrylate, trimethylsilyl methacrylate, 1-butoxyethyl acrylate, 1-butoxyethyl methacrylate, 1-ethoxyethyl acrylate, 1-ethoxyethyl methacrylate, 2-tetrahydropyranyl acrylate, and 2-tetrahydropyranyl methacrylate.

For a cationic graft copolymer dispersant, monomers containing amine groups are the preferred ionizable monomers for the hydrophilic portion. The amine groups may be primary, secondary, or tertiary amine groups, or mixtures thereof. Some examples of useful amine containing monomers are N,N-dimethylaminoethyl acrylate, N,N-dimethylaminoethyl methacrylate, N,N-diethylaminoethyl methacrylate, t-butylaminoethyl methacrylate, 2-N-morpholinoethyl acrylate, 2-N-morpholinoethyl methacrylate, 4-aminostyrene, 2-vinylpyridine, 4-vinylpyridine. Alternatively, functional monomers or polymers may be reacted with an amine to generate the amine groups, such as by reacting a copolymer of glycidyl methacrylate with dimethylamine.

Non-ionic hydrophilic or water soluble monomers having the following formula may be incorporated in the graft copolymer to adjust the hydrophobicity/hydrophilicity balance and solubility properties:

$$CH_2=C(R_3)(C(O)OX_n(CH_2CH_2O)_m)-R_4$$

wherein n is 0 or 1; when n is 1, X is an alkyl, aryl, or alkylaryl diradical connecting group of 1 to 9 carbon atoms; m is 1 to 100, $R_3$ is H or $CH_3$, and $R_4$ is selected from the group consisting of H and alkyl groups of 1 to 4 carbon atoms. Some examples of such comonomers are 2-hydroxyethyl acrylate, 2-hydroxyethyl methacrylate, hydroxypropyl acrylate, 2-(2-methoxyethoxy)ethyl acrylate, 2-(2-methoxyethoxy)ethyl methacrylate, ethoxytriethyleneglycol methacrylate, methoxy polyethyleneglycol monomethacrylate (molecular weight of 200 to 4000, preferably 200 to 2000), and polyethyleneglycol monomethacrylate (molecular weight 200 to 4000, preferably 200 to 2000).

Other commonly used ethylenically unsaturated monomers may be copolymerized into the hydrophilic portion provided they are used at a concentration that will not drastically change the solubility properties in the selected aqueous carrier medium. Some useful examples are alkyl acrylates and alkyl methacrylates with the alkyl group having 1 to 12 carbons, such as methyl acrylate, methyl methacrylate, ethyl acrylate, ethyl methacrylate, butyl acrylate, and butyl methacrylate; and acrylamides and methacrylamides.

The most efficient method for making the graft copolymers of this invention is by using macromonomers. The macromonomer with a terminal polymerizable double bond will become the sidechain of the graft copolymer, and is prepared first. It is then copolymerized with the monomers chosen for the backbone composition. The macromonomers are most conveniently prepared by the free radical polymerization method employing cobalt (II) and cobalt (III) complexes as catalytic chain transfer agents or organic chain transfer agents that are capable of chain transfer by addition fragmentation mechanism. The organic chain transfer agents include allylic sulfides, allylic bromides, methacrylic dimers, α-methylstyrene dimer and related compounds. The cobalt complexes are preferred for practicing this invention because they are not only effective in controlling the molecular weights of the polymers produced, but also act to produce polymer compositions containing a very high percentage of macromonomers. Preferred cobalt chain transfer agents are disclosed in U.S. Pat. No. 4,680,352 to Janowicz et al and U.S. Pat. No. 4,722,984 to Janowicz. The cobalt chain transfer agent may be employed in a concentration range of approximately $1 \times 10^{-8}$ M to $5 \times 10^{-3}$ M. The optimal concentration is dependent on the desired molecular weight and can be obtained through routine experimentation by one skilled in the art of polymerization. By using the suggested range of the concentrations for the chain transfer agents, macromonomers of the molecular weight in the range of 1,000 to 50,000, preferably 1,000 to 10,000, can be conveniently prepared.

The macromonomer is then copolymerized with monomers selected for the backbone via the conventional free radical polymerization method. The molecular weight of the final graft copolymer may be controlled by many methods known to one skilled in the art. The graft copolymers useful for the present invention have a weight average molecular weight of about 1,000 to 100,000, preferably 3,000 to 75,000, more preferably 5,000 to 50,000.

Many common organic solvents are suitable as the polymerization media for preparation of both macromonomers and the graft copolymers. These include but are not limited to alcohols, such as methanol, ethanol, n-propanol and isopropanol, ketones, such as acetone, butanone, pentanone and hexanone, ethers, such as tetrahydrofuran, diethyl ether, and the commonly available ethylene glycol and polyethylene glycol monoalkyl and dialkyl ethers such as cellosolves and carbitols, alkyl esters of acetic, propionic, and butyric acids, glycols such as ethylene glycol, and mixtures thereof. Mixtures of low molecular weight alcohols such as ethanol and isopropanol and low molecular weight ketones such as acetone are particularly useful for preparing macromonomers with high acid content.

Any of the commonly used azo polymerization initiators are suitable for preparation of both macromonomers and the graft copolymers, provided it has solubility in the solvents and monomer mixture solution and has an appropriate half life at the temperature of polymerization. "Appropriate half life", as used herein, is a half life of about 10 minutes to 4 hours. Some examples of such initiators include 2,2'-azobis (isobutyronitrile), 2,2'-azobis(2,4-dimethylvaleronitrile), 2,2'-azobis (methylbutyronitrile), and 1,1'-azobis (cyanocyclohexane). Other non-azo initiators including, among others, benzoyl peroxide, lauroyl peroxide, may also be used provided they do not adversely react with chain transfer agents under the reaction conditions for macromonomers.

To solubilize the graft copolymer into the aqueous carrier medium, it may be necessary to make salts of the ionizable groups in the hydrophilic portion. Salts of the acid groups are prepared by neutralizing them with bases. Some examples of useful bases include alkali metal hydroxides (lithium, sodium, and potassium hydroxide), alkali metal carbonate and bicarbonate (sodium and potassium carbonate and bicarbonate), organic amines (mono-, di-, tri- methylamine, morpholine, N-methylmorpholine), organic alcohol amines (N,N-dimethylethanolamine, N-methyl diethanolamine, mono-, di-, tri-ethanolamine), ammonium salts (ammonium hydroxide, tetra-alkyl ammonium hydroxide), and pyridine. For cationic graft copolymer dispersants, the amine groups are neutralized with acids, including both organic and inorganic acids. Examples of useful acids include organic acid (acetic acid, propionic acid, p-toluene sulfonic acid, formic acid, oxalic acid), hydroxylated acids (glycolic acid, lactic acid), halogenated acids (hydrochloric acid, hydrobromic acid), and inorganic acids (sulfuric acid, phosphoric acid, nitric acid). The cationic groups can also be prepared by converting the amine groups to tetraalkyl ammonium salt by using alkylating agents such as methyl iodide, methyl bromide, benzyl chloride, methyl p-toluene sulfonate, ethyl p-toluene sulfonate, dimethyl sulfate, and the like.

Preferred graft polymers include benzyl acrylate-g-ethoxytriethyleneglycol methacrylate-co-methacrylic acid, 61.6//5.8/32.6% by weight, 2-phenoxyethyl acrylate-co-methyl methacrylate-g-ethoxytriethyleneglycol methacrylate-co-methacrylic acid, 56.9/19.8//2.9/20.4% by weight and 2-phenoxyethyl acrylate-co-N,N-dimethylaminoethyl methacrylate-g-ethoxytriethyleneglycol methacrylate-co-methacrylic acid, 68.3/3.7//3.5/24.5% by weight and ethoxytriethyleneglycol methacrylate-co-N,N-dimethylaminoethyl acrylate-g-2-phenoxyethyl methacrylate, 9.1/45.5//45.4% by weight.

The graft polymer is present in the amount of 0.1 to 30%, preferably 1 to 8%, based on the total weight of the ink. If the amount of polymer becomes too high, it will be difficult to maintain the desired ink viscosity. Dispersion stability of the pigment particles is adversely affected if insufficient graft polymer is present.

ADDITIVES

Depending on the requirements for the application, various types of aqueous additives can be used to modify the properties of the inks. Examples include, coalescing agents, thickeners, thixotropic agents, surfactants, coating aids, biocides, and sequestering agents. It is important for the ionic character of these additives to be compatible with that of the dispersant.

For ink jet ink applications, anionic, cationic, nonionic, or amphoteric surfactants may be present, typically in the amount of 0.01 to 5% and preferably 0.2 to 2%, based on the total weight of the ink. Some examples of useful surfactants are disclosed in U.S. Pat. No. 5,221,334. Biocides such as Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans (Troy Chemical Corp., Newark, N.J.), and sodium benzoate; sequestering agents such as EDTA; and other known additives, such as humectants, and viscosity modifiers may also be added to improve various properties of the ink compositions.

INK PROPERTIES AND PREPARATION

The ink compositions of the invention may be prepared by methods known in the art. It is generally desirable to make the pigment dispersion in a concentrated form, which is subsequently diluted with a suitable liquid containing the desired additives. The pigment dispersion is first prepared by premixing the selected pigment(s) or disperse dye(s) and polymeric dispersant in the aqueous carrier medium and then dispersing or deflocculating the pigment or disperse dye. The dispersing step may be accomplished in a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium. Alternatively, the concentrates may be prepared by dry milling the polymeric dispersant and the pigment under pressure.

The ink drop velocity, drop volume, and stream stability are greatly affected by the surface tension and the viscosity of the ink. Pigmented ink jet inks suitable for use with ink jet printing systems typically have a surface tension in the range of about 20 dyne/cm to about 80 dyne/cm and, more preferably, in the range 25 dyne/cm to about 75 dyne/cm at 20° C. Acceptable viscosities generally are less than, and preferably in the range of about 1.0 cP to about 20.0 cP at 20° C.

The invention will now be illustrated by, but not limited to, the following examples.

EXAMPLES

Example 1

The macromonomer ethoxytriethyleneglycol methacrylate-co-methacrylic acid, 15.0/85.0 by weight was prepared using the following procedure:

| INGREDIENT | WEIGHT (GM) |
| --- | --- |
| Portion 1 | |
| isopropanol | 530.5 |
| acetone | 77.5 |
| methacrylic acid | 70.1 |
| ethoxytriethyleneglycol methacrylate | 12.4 |
| Portion 2 | |
| Diaquabis(borondifluorodiphenyl glyoximato) cobaltate (II), CO(DPG-BF$_2$) | 0.1035 |
| 2,2'-azobis(methylbutyronitrile), (Vazo ® 67, by Du Pont Co., Wilmington, DE) | 0.78 |
| acetone | 21.5 |
| Portion 3 | |
| methacrylic acid | 280.1 |
| ethoxytriethyleneglycol methacrylate | 49.4 |
| Portion 4 | |
| Diaquabis(borondifluorodiphenyl glyoximato) cobaltate (II), Co(DPG-BF$_2$) | 0.1035 |
| 2,2'-azobis(methylbutyronitrile), (Vazo ® 67, by Du Pont Co., Wilmington, DE) | 4.5 |
| Acetone | 47.5 |
| Portion 5 | |
| Diaquabis(borondifluorodiphenyl glyoximato) cobaltate (II), Co(DPG-BF$_2$) | 0.041 |
| 2,2'-azobis(2,2-dimethylvaleronitrile), (Vazo ® 52, by Du Pont Co., Wilmington, DE) | 2.30 |
| acetone | 40.5 |
| Portion 6 | |
| Diaquabis(borondifluorodiphenyl glyoximato) cobaltate (II), Co(DPG-BF$_2$) | 0.062 |
| 2,2'-azobis(2,2-dimethylvaleronitrile), (Vazo ® 52, by Du Pont Co., Wilmington, DE) | 2.30 |
| acetone | 40.5 |
| Total | 1178.0 |

The Portion 1 mixture was charged into a 3 liter flask equipped with a thermometer, stirrer, additional funnels, reflux condenser and a means of maintaining a nitrogen blanket over the reactants. The mixture was heated to reflux temperature and refluxed for about 20 minutes. The Portion 2 solution was added. Subsequently, Portions 3 and 4 were simultaneously added while the reaction mixture was held at reflux temperature at about 72° C. The addition of Portion 3 was completed in 4 hours and the addition of Portion 4 was completed in 90 minutes. When the addition of Portion 4 was completed, the addition of Portion 5 was begun and was completed in 75 minutes. Portion 6 was added over a period of 75 minutes while the reaction mixture was held at reflux temperature throughout the course of addition. Reflux was continued for another hour and the solution was cooled to room temperature.

The resulting macromonomer solution was a clear thin polymer solution and had a solids content of about 34.8%. The macromonomer contained 15% of ethoxytriethyleneglycol methacrylate and 85% of methacrylic acid and had a weight average molecular weight of 3,330 and a number average molecular weight of 1,980 as measured by Gel Permeation Chromatography (GPC) on a methylated macromonomer sample using polymethyl methacrylate as the standard.

Example 2

The macromonomer ethoxytriethyleneglycol methacrylate-co-methacrylic acid, 12.5/87.5 by weight was prepared using the following procedure:

| INGREDIENT | WEIGHT (GM) |
| --- | --- |
| Portion 1 | |
| isopropanol | 453.5 |
| acetone | 152.0 |
| Portion 2 | |
| methacrylic acid monomer | 360.5 |
| ethoxytriethyleneglycol methacrylate monomer | 52.2 |
| Portion 3 | |
| Diaquabis(borondifluorodiphenyl glyoximato) cobaltate (II), Co(DPG-BF$_2$) | 0.31 |
| 2,2'-azobis(2,2-dimethylvaleronitrile), (Vazo ® 52, by Du Pont Co., Wilmington, DE) | 11.86 |
| acetone | 150.0 |
| Total | 1180.4 |

The Portion 1 mixture was charged into a 3 liter flask equipped with a thermometer, stirrer, additional funnels, reflux condenser and a means of maintaining a nitrogen blanket over the reactants. The mixture was heated to reflux temperature and refluxed for about 20 minutes. Portions 2 and 3 were simultaneously added while the reaction mixture was held at reflux temperature at about 70–71° C. The addition of Portion 2 was completed in 4 hours and the addition of Portion 3 was completed in 4½ hours. Reflux was continued for another 2½ hours and the solution was cooled to room temperature.

The resulting macromonomer solution was a clear thin polymer solution and had a solids content of about 32.2%. The macromonomer contained 12.5% of ethoxytriethyleneglycol methacrylate and 87.5% of methacrylic acid and had a weight average molecular weight of 3,350 and a number average molecular weight of 2,570 as measured by Gel Permeation Chromatography (GPC) on a methylated macromonomer sample using polymethyl methacrylate as the standard.

Example 3

This shows the preparation of a graft copolymer, benzyl acrylate-g-ethoxytriethyleneglycol methacrylate-co-methacrylic acid, 61.6//5.8/32.6% by weight, from a macromonomer

| INGREDIENT | WEIGHT (GM) |
| --- | --- |
| Portion 1 | |
| Macromonomer of Example 1 | 114.9 |
| 2-Pyrrolidone | 20.0 |
| Portion 2 | |
| t-butyl peroxypivalate (Lupersol ® 11, Elf Atochem, North America, Inc., Philadelphia, PA) | 0.67 |
| Acetone | 10.0 |
| Portion 3 | |
| Benzyl acrylate | 64.2 |
| 2-Pyrrolidone | 20.0 |

-continued

| INGREDIENT | WEIGHT (GM) |
|---|---|
| Portion 4 | |
| t-butyl peroxypivalate (Lupersol ® 11, Elf Atochem, North America, Inc., Philadelphia, PA) | 2.67 |
| Acetone | 20.0 |
| Portion 5 | |
| t-butyl peroxypivalate (Lupersol ® 11, Elf Atochem, North America, Inc., Philadelphia, PA) | 0.67 |
| Acetone | 10.0 |
| Total | 263.11 |

The Portion 1 mixture was charged into a 500 mL flask equipped with a thermometer, stirrer, additional funnels, reflux condenser and a means of maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at reflux temperature at about 70–71° C. The addition of Portions 3 and 4 was completed in 3 hours. The reaction mixture was refluxed at about 69° C. for 1 hour. The Portion 5 solution was added. The reaction mixture was refluxed at about 65° C. for an additional 2 hours. The mixture was distilled until about 99.8 g of volatiles were collected and 74.6 g of 2-pyrrolidone were added to yield 238.0 g of a 43.3% polymer solution. This graft copolymer contained 61.6% by weight of a homopolymer of benzyl acrylate in the backbone and a random copolymer of 5.8% by weight of ethoxytriethyleneglycol methacrylate and 32.6% by weight of methacrylic acid in the arms. The graft copolymer had a weight average molecular weight of 18,800 and a number average molecular weight of 8,810 as measured by Gel Permeation Chromatography (GPC) on a methylated sample using polymethyl methacrylate as the standard.

Example 4

This shows the preparation of a graft copolymer, benzyl acrylate-co-methyl methacrylate-g-ethoxytriethyleneglycol methacrylate-co-methacrylic acid, 52.7/21.7//3.2/22.4% by weight, from a macromonomer

| INGREDIENT | WEIGHT (GM) |
|---|---|
| Portion 1 | |
| Macromonomer of Example 2 | 465.8 |
| 2-Pyrrolidone | 180.0 |
| Portion 2 | |
| t-butyl peroxypivalate (Lupersol ® 11, Elf Atochem, North America, Inc., Philadelphia, PA) | 3.0 |
| Acetone | 30.0 |
| Portion 3 | |
| Benzyl acrylate | 309.0 |
| Methyl methacrylate | 127.2 |
| Portion 4 | |
| t-butyl peroxypivalate (Lupersol ® 11, Elf Atochem, North America, Inc., | 12.0 |

-continued

| INGREDIENT | WEIGHT (GM) |
|---|---|
| Philadelphia, PA) | |
| Acetone | 150.0 |
| Portion 5 | |
| t-butyl peroxypivalate (Lupersol ® 11, Elf Atochem, North America, Inc., Philadelphia, PA) | 3.0 |
| Acetone | 30.0 |
| Total | 1310.0 |

The Portion 1 mixture was charged into a 500 mL flask equipped with a thermometer, stirrer, additional funnels, reflux condenser and a means of maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at reflux temperature at about 75° C. The addition of Portions 3 and 4 was completed in 3 hours. The reaction mixture was refluxed at about 72° C. for 1 hour. The Portion 5 solution was added. The reaction mixture was refluxed at about 69° C. for additional 2 hours. The mixture was distilled until about 470.1 g of volatiles were collected and 465.0 g of 2-pyrrolidone were added to yield 1304.9 g of a 44.8% polymer solution. This graft copolymer contained a random copolymer of 52.7% by weight of benzyl acrylate and 21.7% by weight of methyl methacrylate in the backbone and a random copolymer of 3.2% by weight of ethoxytriethyleneglycol methacrylate and 22.4% by weight of methacrylic acid in the arms. The graft copolymer had a weight average molecular weight of 20,110 and a number average molecular weight of 9,057 as measured by Gel Permeation Chromatography (GPC) using polystyrene as the standard.

Example 5

This shows the preparation of a graft copolymer, 2-phenoxyethyl acrylate-g-ethoxytriethyleneglycol methacrylate-co-methacrylic acid, 66.2//4.2/29.6% by weight, from a macromonomer

| INGREDIENT | WEIGHT (GM) |
|---|---|
| Portion 1 | |
| Macromonomer of Example 2 | 107.2 |
| 2-Pyrrolidone | 30.0 |
| Portion 2 | |
| t-butyl peroxypivalate (Lupersol ® 11, Elf Atochem, North America, Inc., Philadelphia, PA) | 0.75 |
| Acetone | 5.0 |
| Portion 3 | |
| 2-Phenoxyethyl acrylate | 73.4 |
| Portion 4 | |
| t-butyl peroxypivalate (Lupersol ® 11, Elf Atochem, North America, Inc., Philadelphia, PA) | 3.0 |
| Acetone | 25.0 |

-continued

| INGREDIENT | WEIGHT (GM) |
|---|---|
| Portion 5 | |
| t-butyl peroxypivalate (Lupersol ® 11, Elf Atochem, North America, Inc., Philadelphia, PA) | 0.75 |
| Acetone | 5.0 |
| Total | 250.1 |

The Portion 1 mixture was charged into a 500 mL flask equipped with a thermometer, stirrer, additional funnels, reflux condenser and a means of maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at reflux temperature. The addition of Portions 3 and 4 was completed in 3 hours. The reaction mixture was refluxed at about 65° C. for 1 hour. The Portion 5 solution was added. The reaction mixture was refluxed at about 65° C. for an additional 2 hours. The mixture was distilled until about 95.7 g of volatiles were collected and 92.0 g of 2-pyrrolidone were added to yield 246.4 g of a 43.9% polymer solution. This graft copolymer contained 66.2% by weight of a homopolymer of 2-phenoxyethyl acrylate in the backbone and a random copolymer of 4.2% by weight of ethoxytriethyleneglycol methacrylate and 29.6% by weight of methacrylic acid in the arms. The graft copolymer had a weight average molecular weight of 20,900 and a number average molecular weight of 9,440 as measured by Gel Permeation Chromatography (GPC) on a methylated sample using polymethyl methacrylate as the standard.

Example 6

This shows the preparation of a graft copolymer, 2-phenoxyethyl acrylate-co-methyl methacrylate-g-ethoxytriethyleneglycol methacrylate-co-methacrylic acid, 56.9/19.8//2.9/20.4% by weight, from a macromonomer

| INGREDIENT | WEIGHT (GM) |
|---|---|
| Portion 1 | |
| Macromonomer of Example 2 | 85.7 |
| 2-Pyrrolidone | 30.0 |
| Portion 2 | |
| t-butyl peroxypivalate (Lupersol ® 11, Elf Atochem, North America, Inc., Philadelphia, PA) | 0.75 |
| Acetone | 5.0 |
| Portion 3 | |
| 2-Phenoxyethyl acrylate | 73.2 |
| Methyl methacrylate | 25.5 |
| Portion 4 | |
| t-butyl peroxypivalate (Lupersol ® 11, Elf Atochem, North America, Inc., Philadelphia, PA) | 3.0 |
| Acetone | 20.0 |

-continued

| INGREDIENT | WEIGHT (GM) |
|---|---|
| Portion 5 | |
| t-butyl peroxypivalate (Lupersol ® 11, Elf Atochem, North America, Inc. Philadelphia, PA) | 0.75 |
| Acetone | 5.0 |
| Total | 248.9 |

The Portion 1 mixture was charged into a 500 mL flask equipped with a thermometer, stirrer, additional funnels, reflux condenser and a means of maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at reflux temperature. The addition of Portions 3 and 4 was completed in 3 hours. The reaction mixture was refluxed for 1 hour. The Portion 5 solution was added. The reaction mixture was refluxed at about 66° C. for an additional 2 hours. The mixture was distilled until about 74.5 g of volatiles were collected and 111.6 g of 2-pyrrolidone were added to yield 286.0 g of a 43.7% polymer solution. This graft copolymer contained a random copolymer of 56.9% by weight of 2-phenoxyethyl acrylate and 19.8% by weight of methyl methacrylate in the backbone and a random copolymer of 2.9% by weight of ethoxytriethyleneglycol methacrylate and 20.4% by weight of methacrylic acid in the arms. The graft copolymer had a weight average molecular weight of 60,460 and a number average molecular weight of 11,990 as measured by Gel Permeation Chromatography (GPC) using polystyrene as the standard.

Example 7

This shows the preparation of a graft copolymer, 2-phenylethyl acrylamide-co-methyl acrylate-g-ethoxytriethyleneglycol methacrylate-co-methacrylic acid, 56.6/11.6//4.0/27.8% by weight, from a macromonomer

| INGREDIENT | WEIGHT (GM) |
|---|---|
| Portion 1 | |
| Macromonomer of Example 2 | 85.7 |
| Portion 2 | |
| t-butyl peroxypivalate (Lupersol ® 11, Elf Atochem, North America, Inc. Philadelphia, PA) | 0.5 |
| Isopropanol | 5.0 |
| Portion 3 | |
| 2-Phenylethyl acrylamide | 53.4 |
| Methyl acrylate | 11.0 |
| 2-Pyrrolidone | 30.0 |
| Isopropanol | 20.0 |
| Portion 4 | |
| t-butyl peroxypivalate (Lupersol ® 11, Elf Atochem, North America, Inc. Philadelphia, PA) | 3.0 |
| Isopropanol | 20.0 |

| INGREDIENT | WEIGHT (GM) |
|---|---|
| -continued | |
| Portion 5 | |
| t-butyl peroxypivalate (Lupersol ® 11, Elf Atochem, North America, Inc. Philadelphia, PA) | 0.5 |
| Isopropanol | 5.0 |
| Total | 234.1 |

The Portion 1 mixture was charged into a 500 mL flask equipped with a thermometer, stirrer, additional funnels, reflux condenser and a means of maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at reflux temperature. The addition of Portions 3 and 4 was completed in 3 hours. The reaction mixture was refluxed at about 71° C. for 1 hour. The Portion 5 solution was added. The reaction mixture was refluxed for another hour. The mixture was distilled until about 93.9 g of volatiles were collected and 73.8 g of 2-pyrrolidone were added to yield 214.0 g of a 44.0% polymer solution. This graft copolymer contained a random copolymer of 56.6% by weight of 2-phenylethyl acrylamide and 11.6% by weight of methyl acrylate in the backbone and a random copolymer of 4.0% by weight of ethoxytriethyleneglycol methacrylate and 27.8% by weight of methacrylic acid in the arms. The graft copolymer had a weight average molecular weight of 6,040 and a number average molecular weight of 4,310 as measured by Gel Permeation Chromatography (GPC) using polystyrene as the standard.

Example 8

This shows the preparation of a graft copolymer, benzyl acrylamide-co-methyl acrylate-g-ethoxytriethyleneglycol methacrylate-co-methacrylic acid, 54.5/12.2//4.2/29.1% by weight, from a macromonomer

| INGREDIENT | WEIGHT (GM) |
|---|---|
| Portion 1 | |
| Macromonomer of Example 2 | 67.2 |
| Portion 2 | |
| t-butyl peroxypivalate (Lupersol ® 11, Elf Atochem, North America, Inc., Philadelphia, PA) | 0.4 |
| Isopropanol | 5.0 |
| Portion 3 | |
| Benzyl acrylamide | 38.5 |
| Methyl acrylate | 8.6 |
| 2-Pyrrolidone | 30.0 |
| Isopropanol | 20.0 |
| Portion 4 | |
| t-butyl peroxypivalate (Lupersol ® 11, Elf Atochem, North America, Inc., Philadelphia, PA) | 2.5 |
| Isopropanol | 20.0 |

| INGREDIENT | WEIGHT (GM) |
|---|---|
| -continued | |
| Portion 5 | |
| t-butyl peroxypivalate (Lupersol ® 11, Elf Atochem, North America, Inc., Philadelphia, PA) | 0.4 |
| Isopropanol | 5.0 |
| Total | 197.6 |

The Portion 1 mixture was charged into a 500 mL flask equipped with a thermometer, stirrer, additional funnels, reflux condenser and a means of maintaining a nitrogen blanket over the reaction mixture. The mixture was heated to the reflux temperature and refluxed for about 10 minutes. The Portion 2 solution was added. Subsequently, Portions 3 and 4 were simultaneously added while the reaction mixture was held at reflux temperature. The addition of Portions 3 and 4 were completed in 3 hours. The reaction mixture was refluxed at about 72° C. for 1 hour. The Portion 5 solution was added. The reaction mixture was refluxed for another hour. The mixture was distilled until about 83.3 g of volatiles were collected and 47.7 g of 2-pyrrolidone were added to yield 162.0 g of a 45.0% polymer solution. This graft copolymer contained a random copolymer of 54.5% by weight of benzyl acrylamide and 12.2% by weight of methyl acrylate in the backbone and a random copolymer of 4.2% by weight of ethoxytriethyleneglycol methacrylate and 29.1% by weight of methacrylic acid in the arms. The graft copolymer had a weight average molecular weight of 12,800 and a number average molecular weight of 7,110 as measured by Gel Permeation Chromatography (GPC) using polystyrene as the standard.

Example 9

This shows the preparation of a graft copolymer, benzyl methacrylamide-co-ethyl acrylate-g-ethoxytriethyleneglycol methacrylate-co-methacrylic acid, 51.1/14.6//4.3/30.0% by weight, from a macromonomer

| INGREDIENT | WEIGHT (GM) |
|---|---|
| Portion 1 | |
| Macromonomer of Example 2 | 81.2 |
| Portion 2 | |
| t-butyl peroxypivalate (Lupersol ® 11, Elf Atochem, North America, Inc., Philadelphia, PA) | 0.4 |
| Isopropanol | 4.0 |
| Portion 3 | |
| Benzyl methacrylamide | 42.4 |
| Ethyl acrylate | 12.1 |
| 2-Pyrrolidone | 24.4 |
| Isopropanol | 46.2 |
| Portion 4 | |
| t-butyl peroxypivalate (Lupersol ® 11, Elf Atochem, North America, Inc., Philadelphia, PA) | 2.4 |
| Isopropanol | 16.2 |

-continued

| INGREDIENT | WEIGHT (GM) |
|---|---|
| Portion 5 | |
| t-butyl peroxypivalate (Lupersol ® 11, Elf Atochem, North America, Inc., Philadelphia, PA) | 0.4 |
| Isopropanol | 4.0 |
| Total | 203.7 |

The Portion 1 mixture was charged into a 500 mL flask equipped with a thermometer, stirrer, additional funnels, reflux condenser and a means of maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at reflux temperature. The addition of Portions 3 and 4 was completed in 3 hours. The reaction mixture was refluxed at about 72° C. for 1 hour. The Portion 5 solution was added. The reaction mixture was refluxed for another hour. The mixture was distilled until about 86.5 g of volatiles were collected and 66.8 g of 2-pyrrolidone were added to yield 184.0 g of a 45.8% polymer solution. This graft copolymer contained a random copolymer of 51.1% by weight of benzyl methacrylamide and 14.6% by weight of ethyl acrylate in the backbone and a random copolymer of 4.3% by weight of ethoxytriethyleneglycol methacrylate and 30.0% by weight of methacrylic acid in the arms.

Example 10

This shows the preparation of a graft copolymer, 2-phenoxyethyl acrylate-g-ethoxytriethyleneglycol methacrylate-co-methacrylic acid, 71.0//3.6/25.4% by weight, from a macromonomer

| INGREDIENT | WEIGHT (GM) |
|---|---|
| Portion 1 | |
| Macromonomer of Example 2 | 100.0 |
| 2-Pyrrolidone | 30.0 |
| Portion 2 | |
| t-butyl peroxypivalate (Lupersol ® 11, Elf Atochem, North America, Inc., Philadelphia, PA) | 0.75 |
| Isopropanol | 5.0 |
| Portion 3 | |
| 2-Phenoxyethyl acrylate | 85.6 |
| Portion 4 | |
| t-butyl peroxypivalate (Lupersol ® 11, Elf Atochem, North America, Inc., Philadelphia, PA) | 3.00 |
| Isopropanol | 20.0 |
| Portion 5 | |
| t-butyl peroxypivalate (Lupersol ® 11, Elf Atochem, North America, Inc., Philadelphia, PA) | 0.75 |
| Isopropanol | 5.0 |
| Total | 250.1 |

The Portion 1 mixture was charged into a 500 mL flask equipped with a thermometer, stirrer, additional funnels, reflux condenser and a means of maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at the reflux temperature, at about 70–71° C. The addition of Portions 3 and 4 was completed in 3 hours. The reaction mixture was refluxed at about 69° C. for 1 hour. The Portion 5 solution was added. The reaction mixture was refluxed at about 65° C. for an additional 2 hours. The mixture was distilled until about 84.8 g of volatiles were collected and 102.7 g of 2-pyrrolidone were added to yield 265.7 g of a 44.9% polymer solution. This graft copolymer contained 71.0% by weight of a homopolymer of 2-phenoxyethyl acrylate in the backbone and a random copolymer of 3.6% by weight of ethoxytriethyleneglycol methacrylate and 25.4% by weight of methacrylic acid in the arms. The graft copolymer had a weight average molecular weight of 32,600 and a number average molecular weight of 14,300 as measured by Gel Permeation Chromatography (GPC) on a methylated sample using polymethyl methacrylate as the standard.

Example 11

This shows the preparation of a graft copolymer, 2-phenoxyethyl acrylate-co-N,N-dimethylaminoethyl methacrylate-g-ethoxytriethyleneglycol methacrylate-co-methacrylic acid, 63.6/10.4//3.2/22.8% by weight, from a macromonomer

| INGREDIENT | WEIGHT (GM) |
|---|---|
| Portion 1 | |
| Macromonomer of Example 2 | 100.0 |
| 2-Pyrrolidone | 30.0 |
| Portion 2 | |
| t-butyl peroxypivalate (Lupersol ® 11, Elf Atochem, North America, Inc., Philadelphia, PA) | 0.75 |
| Isopropanol | 5.0 |
| Portion 3 | |
| 2-Phenoxyethyl acrylate | 85.4 |
| N,N-Dimethylaminoethyl methacrylate | 14.0 |
| Portion 4 | |
| t-butyl peroxypivalate (Lupersol ® 11, Elf AtochemNorth America, Inc., Philadelphia, PA) | 3.0 |
| Isopropanal | 20.0 |
| Portion 5 | |
| t-butyl peroxypivalate (Lupersol ® 11, Elf Atochem, North America, Inc., Philadelphia, PA) | 0.75 |
| Isopropanol | 5.0 |
| Total | 263.9 |

The Portion 1 mixture was charged into a 500 mL flask equipped with a thermometer, stirrer, additional funnels, reflux condenser and a means for maintaining a nitrogen blanket over the reaction mixture. The mixture was heated to the reflux temperature and refluxed for about 10 minutes. The Portion 2 solution was added. Subsequently, Portions 3 and 4 were simultaneously added while the reaction mixture was held at the reflux temperature at about 70–71° C. The addition of Portions 3 and 4 was completed in 3 hours. The reaction mixture was refluxed at about 72° C. for 1 hour. The Portion 5 solution was added. The reaction mixture was refluxed for an additional 2 hours. The mixture was distilled until about 83.0 g of volatiles were collected and 117.8 g of 2-pyrrolidone were added to yield 305.5 g of a 43.2% polymer solution. This graft copolymer contained 74.0% by weight of a copolymer of 2-phenoxyethyl acrylate and N,N-dimethylaminoethyl methacrylate in the backbone and a random copolymer of 3.2% by weight of ethoxytriethyleneglycol methacrylate and 22.8% by weight of methacrylic acid in the arms. The graft copolymer had a weight average molecular weight of 10,700 and a number average molecular weight of 6,070 as measured by Gel Permeation Chromatography (GPC) on a methylated sample using polymethyl methacrylate as the standard.

Example 12

This shows the preparation of a graft copolymer, 2-phenoxyethyl acrylate-co-N,N-dimethylaminoethyl methacrylate-g-ethoxytriethyleneglycol methacrylate-co-methacrylic acid, 65.9/7.1//3.4/23.6% by weight, from a macromonomer

| INGREDIENT | WEIGHT (GM) |
| --- | --- |
| Portion 1 | |
| Macromonomer of Example 2 | 100.0 |
| 2-Pyrrolidone | 30.0 |
| Portion 2 | |
| t-butyl peroxypivalate (Lupersol ® 11, Elf Atochem, North America, Inc., Philadelphia, PA) | 0.75 |
| Isopropanol | 5.0 |
| Portion 3 | |
| 2-Phenoxyethyl acrylate | 85.5 |
| N, N-Dimethylaminoethyl methacrylate | 9.2 |
| Portion 4 | |
| t-butyl peroxypivalate (Lupersol ® 11, Elf Atochem, North America, Inc. Philadelphia, PA) | 3.0 |
| Isopropanol | 20.0 |
| Portion 5 | |
| t-butyl peroxypivalate (Lupersol ® 11, Elf Atochem, North America, Inc. Philadelphia, PA) | 0.75 |
| Isopropanol | 5.0 |
| Total | 259.2 |

The Portion 1 mixture was charged into a 500 mL flask equipped with a thermometer, stirrer, additional funnels, reflux condenser and a means for maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at the reflux temperature of about 70–71° C. The addition of Portions 3 and 4 was completed in 3 hours. The reaction mixture was refluxed at about 72° C. for 1 hour. The Portion 5 solution was added. The reaction mixture was refluxed for an additional 2 hours. The mixture was distilled until about 83.7 g of volatiles were collected and 112.7 g of 2-pyrrolidone were added to yield 291.1 g of a 44.0% polymer solution. This graft copolymer contained 73.0% by weight of a copolymer of 2-phenoxyethyl acrylate and N,N-dimethylaminoethyl methacrylate in the backbone and a random copolymer of 3.4% by weight of ethoxytriethylene-glycol methacrylate and 23.6% by weight of methacrylic acid in the arms.

Example 13

This shows the preparation of a graft copolymer, 2-phenoxyethyl acrylate-co-N,N-dimethylaminoethyl methacrylate-g-ethoxytriethyleneglycol methacrylate-co-methacrylic acid, 68.3/3.7//3.5/24.5% by weight, from a macromonomer

| INGREDIENT | WEIGHT (GM) |
| --- | --- |
| Portion 1 | |
| Macromonomer of Example 2 | 100.0 |
| 2-Pyrrolidone | 30.0 |
| Portion 2 | |
| t-butyl peroxypivalate (Lupersol ® 11, Elf Atochem, North America, Inc., Philadelphia, PA) | 0.75 |
| Isopropanol | 5.0 |
| Portion 3 | |
| 2-Phenoxyethyl acrylate | 85.4 |
| N, N-Dimethylaminoethyl methacrylate | 4.6 |
| Portion 4 | |
| t-butyl peroxypivalate (Lupersol ® 11, Elf Atochem, North America, Inc., Philadelphia, PA) | 3.0 |
| Isopropanol | 20.0 |
| Portion 5 | |
| t-butyl peroxypivalate (Lupersol ® 11, Elf Atochem, North America, Inc., Philadelphia, PA) | 0.75 |
| Isopropanol | 5.0 |
| Total | 254.5 |

The Portion 1 mixture was charged into a 500 mL flask equipped with a thermometer, stirrer, additional funnels, reflux condenser and a means for maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at the reflux temperature of about 70–71° C. The addition of Portions 3 and 4 was completed in 3 hours. The reaction mixture was refluxed at about 72° C. for 1 hour. The Portion 5 solution was added. The reaction mixture was refluxed for an additional 2 hours. The mixture was distilled until about 84.2 g of volatiles were collected and 107.5 g of 2-pyrrolidone were added to yield 272.6 g of a 45.7% polymer solution. This graft copolymer contained 72.0% by weight of a copolymer of 2-phenoxyethyl acrylate and N,N-dimethylaminoethyl methacrylate in the backbone and a random copolymer of 3.5% by weight of ethoxytriethylene-glycol methacrylate and 24.5% by weight of methacrylic acid in the arms. The graft copolymer had a weight average molecular weight of 8,820 and a number average molecular weight of 6,250 as measured by Gel Permeation Chromatography (GPC) on a methylated sample using polymethyl methacrylate as the standard.

Comparative Example 1

This shows the preparation of a graft copolymer, styrene-co-ethyl acrylate-g-ethoxytriethyleneglycol methacrylate-co-methacrylic acid, 44.0/11.0//5.6/39.4% by weight, from a macromonomer

| INGREDIENT | WEIGHT (GM) |
|---|---|
| Portion 1 | |
| Macromonomer of Example 2 | 128.6 |
| 2-Pyrrolidone | 30.0 |
| Portion 2 | |
| t-butyl peroxypivalate (Lupersol ® 11, Elf Atochem, North America, Inc., Philadelphia, PA) | 0.5 |
| Isopropanol | 5.0 |
| Portion 3 | |
| Styrene | 44.0 |
| Ethyl acrylate | 11.0 |
| Portion 4 | |
| t-butyl peroxypivalate (Lupersol ® 11, Elf Atochem, North America, Inc., Philadelphia, PA) | 3.0 |
| Isopropanol | 20.0 |
| Portion 5 | |
| t-butyl peroxypivalate (Lupersol ® 11, Elf Atochem, North America, Inc. Philadelphia, PA) | 0.5 |
| Isopropanol | 5.0 |
| Total | 247.6 |

The Portion 1 mixture was charged into a 500 mL flask equipped with a thermometer, stirrer, additional funnels, reflux condenser and a means for maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at reflux temperature. The addition of Portion 3 and 4 was completed in 3 hours. The reaction mixture was refluxed at about 66° C. for 1 hour. The Portion 5 solution was added. The reaction mixture was refluxed for another hour. The mixture was distilled until about 114.6 g of volatiles were collected and 80.0 g of 2-pyrrolidone were added to yield 213.0 g of a 43.8% polymer solution. This graft copolymer contained a random copolymer of 44.0% by weight of styrene and 11.0% by weight of ethyl acrylate in the backbone and a random copolymer of 5.6% by weight of ethoxytriethyleneglycol methacrylate and 39.4% by weight of methacrylic acid in the arms. The graft copolymer had a weight average molecular weight of 9,690 and a number average molecular weight of 5,480 as measured by Gel Permeation Chromatography (GPC) on a methylated sample using polymethyl methacrylate as the standard.

Comparative Example 2

This shows the preparation of a graft copolymer, butyl acrylate-co-methyl acrylate-g-ethoxytriethyleneglycol methacrylate-co-methacrylic acid, 66.2//4.2/29.6% by weight, from a macromonomer

| INGREDIENT | WEIGHT (GM) |
|---|---|
| Portion 1 | |
| Macromonomer of Example 2 | 107.2 |
| 2-Pyrrolidone | 30.0 |
| Portion 2 | |
| t-butyl peroxypivalate (Lupersol ® 11, Elf Atochem, North America, Inc. Philadelphia, PA) | 0.5 |
| Isopropanol | 5.0 |
| Portion 3 | |
| Butyl acrylate | 73.4 |
| Portion 4 | |
| t-butyl peroxypivalate (Lupersol ® 11, Elf Atochem, North America, Inc., Philadelphia, PA) | 3.0 |
| Isopropanol | 20.0 |
| Portion 5 | |
| t-butyl peroxypivalate (Lupersol ® 11, Elf Atochem, North America, Inc., Philadelphia, PA) | 0.5 |
| Isopropanol | 5.0 |
| Total | 244.6 |

The Portion 1 mixture was charged into a 500 mL flask equipped with a thermometer, stirrer, additional funnels, reflux condenser and a means for maintaining a nitrogen blanket over the reaction mixture. The mixture was heated to the reflux temperature and refluxed for about 10 minutes. The Portion 2 solution was added. Subsequently, Portions 3 and 4 were simultaneously added while the reaction mixture was held at reflux temperature. The addition of Portions 3 and 4 was completed in 3 hours. The reaction mixture was refluxed for 1 hour. The Portion 5 solution was added. The reaction mixture was refluxed for another hour. The mixture was distilled until about 98.6 g of volatiles were collected and 92.0 g of 2-pyrrolidone were added to yield 238 g of a 45.4% polymer solution. This graft copolymer contained a homopolymer of 66.2% by weight of butyl acrylate in the backbone and a random copolymer of 4.2% by weight of ethoxytriethyleneglycol methacrylate and 29.6% by weight of methacrylic acid in the arms. The graft copolymer had a weight average molecular weight of 33,500 and a number average molecular weight of 18,600 as measured by Gel Permeation Chromatography (GPC) on a methylated sample using polymethyl methacrylate as the standard.

Comparative Example 3

This shows the preparation of a graft copolymer, butyl acrylate-co-methyl acrylate-g-ethoxytriethyleneglycol methacrylate-co-methacrylic acid, 66.2//4.2/29.6% by weight, from a macromonomer in the presence of a chain transfer agent

| INGREDIENT | WEIGHT (GM) |
|---|---|
| Portion 1 | |
| Macromonomer of Example 2 | 107.2 |
| 2-Pyrrolidone | 30.0 |

| INGREDIENT | WEIGHT (GM) |
|---|---|
| Portion 2 | |
| t-butyl peroxypivalate (Lupersol ® 11, Elf Atochem, North America, Inc., Philadelphia, PA) | 0.5 |
| Isopropanol | 5.0 |
| Portion 3 | |
| Butyl acrylate | 73.4 |
| n-Butyl mercaptan | 0.75 |
| Portion 4 | |
| t-butyl peroxypivalate (Lupersol ® 11, Elf Atochem, North America, Inc., Philadelphia, PA) | 3.0 |
| Isopropanol | 20.0 |
| Portion 5 | |
| t-butyl peroxypivalate (Lupersol ® 11, Elf Atochem, North America, Inc. Philadelphia, PA) | 0.5 |
| Isopropanol | 5.0 |
| Total | 245.35 |

The Portion 1 mixture was charged into a 500 mL flask equipped with a thermometer, stirrer, additional funnels, reflux condenser and a means for maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at reflux temperature. The addition of Portions 3 and 4 was completed in 3 hours. The reaction mixture was refluxed for 1 hour. The Portion 5 solution was added. The reaction mixture was refluxed for another hour. The mixture was distilled until about 86.1 g of volatiles were collected and 92.0 g of 2-pyrrolidone were added to yield 250.5 g of a 44.3% polymer solution. This graft copolymer contained a homopolymer of 66.2% by weight of butyl acrylate in the backbone and a random copolymer of 4.2% by weight of ethoxytriethyleneglycol methacrylate and 29.6% by weight of methacrylic acid in the arms. The graft copolymer had a weight average molecular weight of 21,800 and a number average molecular weight of 10,300 as measured by Gel Permeation Chromatography (GPC) on a methylated sample using polymethyl methacrylate as the standard.

Comparative Example 4

This shows the preparation of a graft copolymer, butyl acrylate-co-methyl acrylate-g-ethoxytriethyleneglycol methacrylate-co-methacrylic acid, 66.2//4.2/29.6% by weight, from a macromonomer in presence of a chain transfer agent

| INGREDIENT | WEIGHT (GM) |
|---|---|
| Portion 1 | |
| Macromonomer of Example 2 | 107.2 |
| 2-Pyrrolidone | 30.0 |

| INGREDIENT | WEIGHT (GM) |
|---|---|
| Portion 2 | |
| t-butyl peroxypivalate (Lupersol ® 11, Elf Atochem, North America, Inc., Philadelphia, PA) | 0.5 |
| Isopropanol | 5.0 |
| Portion 3 | |
| Butyl acrylate | 73.4 |
| n-Butyl mercaptan | 1.13 |
| Portion 4 | |
| t-butyl peroxypivalate (Lupersol ® 11, Elf Atochem, North America, Inc., Philadelphia, PA) | 3.0 |
| Isopropanol | 20.0 |
| Portion 5 | |
| t-butyl peroxypivalate (Lupersol ® 11, Elf Atochem, North America, Inc., Philadelphia, PA) | 0.5 |
| Isopropanol | 5.0 |
| Total | 245.7 |

The Portion 1 mixture was charged into a 500 mL flask equipped with a thermometer, stirrer, additional funnels, reflux condenser and a means for maintaining a nitrogen blanket over the reaction mixture. The mixture was heated to reflux temperature and refluxed for about 10 minutes. The Portion 2 solution was added. Subsequently, Portions 3 and 4 were simultaneously added while the reaction mixture was held at reflux temperature. The addition of Portions 3 and 4 were completed in 3 hours. The reaction mixture was refluxed for 1 hour. The Portion 5 solution was added. The reaction mixture was refluxed for another hour. The mixture was distilled until about 91.3 g of volatiles were collected and 92.0 g of 2-pyrrolidone were added to yield 246.4 g of a 44.8% polymer solution. This graft copolymer contained a homopolymer of 66.2% by weight of butyl acrylate in the backbone and a random copolymer of 4.2% by weight of ethoxytriethyleneglycol methacrylate and 29.6% by weight of methacrylic acid in the arms. The graft copolymer had a weight average molecular weight of 15,300 and a number average molecular weight of 6,090 as measured by Gel Permeation Chromatography (GPC) on a methylated sample using polymethyl methacrylate as the standard.

Comparative Example 5

This shows the preparation of a graft copolymer, styrene-co-ethyl acrylate-g-ethoxytriethyleneglycol methacrylate-co-methacrylic acid, 56.0/14.0//3.7/26.3% by weight, from a macromonomer

| INGREDIENT | WEIGHT (GM) |
|---|---|
| Portion 1 | |
| Macromonomer of Example 2 | 85.7 |
| 2-Pyrrolidone | 30.0 |

-continued

| INGREDIENT | WEIGHT (GM) |
| --- | --- |
| Portion 2 | |
| t-butyl peroxypivalate (Lupersol ® 11, Elf Atochem, North America, Inc., Philadelphia, PA) | 0.5 |
| Isopropanol | 5.0 |
| Portion 3 | |
| Styrene | 56.0 |
| Ethyl acrylate | 14.0 |
| Portion 4 | |
| t-butyl peroxypivalate (Lupersol ® 11, Elf Atochem, North America, Inc., Philadelphia, PA) | 3.0 |
| Isopropanol | 20.0 |
| Portion 5 | |
| t-butyl peroxypivalate (Lupersol ® 11, Elf Atochem, North America, Inc., Philadelphia, PA) | 0.5 |
| Isopropanol | 5.0 |
| Total | 219.7 |

The Portion 1 mixture was charged into a 500 mL flask equipped with a thermometer, stirrer, additional funnels, reflux condenser and a means for maintaining a nitrogen blanket over the reaction mixture. The mixture was heated to the reflux temperature and refluxed for about 10 minutes. The Portion 2 solution was added. Subsequently, Portions 3 and 4 were simultaneously added while the reaction mixture was held at the reflux temperature. The addition of Portions 3 and 4 was completed in 3 hours. The reaction mixture was refluxed for 1 hour. The Portion 5 solution was added. The reaction mixture was refluxed for another hour. The mixture was distilled until about 77.5 g of volatiles were collected and 80.0 g of 2-pyrrolidone were added to yield 222.2 g of a 37.3% polymer solution as compared to the expected 45.0%. The calculated conversion is about 83%. A strong odor of styrene monomer was detected and a high level of monomeric styrene was measured by HPLC.

Example 14

The graft copolymer of Example 3 was neutralized using the following procedure: 46.2 g of the polymer were mixed with 9.93 g of potassium hydroxide solution (45.6% in deionized water) and 144.5 g of deionized water until a homogeneous 10% polymer solution was obtained. The pH of the polymer solution was 9.19.

The polymer solution was mixed with 40 g of FW18 carbon black (Degussa Corp., Allendale, N.J.) and 159.4 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 10% pigment concentration with an average particle size of 115 nm as determined by Brookhaven BI-90 particle sizer, and a pH of 8.31.

Example 15

The graft copolymer of Example 4 was neutralized using the following procedure: 37.2 g of the polymer were mixed with 5.80 g of potassium hydroxide solution (45.6% in deionized water) and 157.0 g of deionized water until a homogeneous 10% polymer solution was obtained. The pH of the polymer solution was 9.03.

The polymer solution was mixed with 50 g of FW18 carbon black (Degussa Corp., Allendale, N.J.) and stirred mechanically for 0.5 hour. The mixture was then processed with a microfluidizer (Microfluidics Corp., Watham, Mass.) by passing it through the interaction chamber 5 times under a liquid pressure of about 7,000 psi. The resulting pigment dispersion had 20% pigment concentration with an average particle size of 109 nm as determined by Brookhaven BI-90 particle sizer, and a pH of 8.29.

Example 16

The graft copolymer of Example 5 was neutralized using the following procedure: 45.6 g of the polymer were mixed with 8.5 g of potassium hydroxide solution (45.6% in deionized water) and 146.0 g of deionized water until a homogeneous 10% polymer solution was obtained. The pH of the polymer solution was 9.20.

The polymer solution was mixed with 48 g of FW18 carbon black (Degussa Corp., Allendale, N.J.) and 72.0 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 106 nm as determined by Brookhaven BI-90 particle sizer, and a pH of 8.19.

Example 17

The graft copolymer of Example 6 was neutralized using the following procedure: 44.0 g of the polymer were mixed with 5.8 g of potassium hydroxide solution (45.6% in deionized water) and 151.2 g of deionized water until a homogeneous 10% polymer solution was obtained. The pH of the polymer solution was 9.2.

The polymer solution was mixed with 48 g of FW18 carbon black (Degussa Corp., Allendale, N.J.) and 72.0 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 108 nm as determined by a Brookhaven BI-90 particle sizer, and a pH of 8.25.

Example 18

The graft copolymer of Example 6 was neutralized using the following procedure: 90.9 g of the polymer were mixed with 17.0 g of potassium hydroxide solution (45.6% in deionized water) and 292.1 g of deionized water until a homogeneous 10% polymer solution was obtained. The pH of the polymer solution was 8.5.

The polymer solution, 200 g, was mixed with 40 g of FW18 carbon black (Degussa Corp., Allendale, N.J.) and 26.7 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 110 nm as determined by a Brookhaven BI-90 particle sizer.

Example 19

The graft copolymer of Example 8 was neutralized using the following procedure: 88.9 g of the polymer were mixed with 17.6 g of potassium hydroxide solution (45.6% in deionized water) and 293.5 g of deionized water until a homogeneous l0o polymer solution was obtained. The pH of the polymer solution was 8.5.

The polymer solution, 200 g, was mixed with 40 g of FW18 carbon black (Degussa Corp., Allendale, N.J.) and 26.7 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 115 nm as determined by a Brookhaven BI-90 particle sizer.

Example 20

The graft copolymer of Example 9 was neutralized using the following procedure: 87.3 g of the polymer were mixed with 17.8 g of potassium hydroxide solution (45.6% in deionized water) and 294.9 g of deionized water until a homogeneous 10% polymer solution was obtained. The pH of the polymer solution was 8.5.

The polymer solution, 200 g, was mixed with 40 g of FW18 carbon black (Degussa Corp., Allendale, N.J.) and 26.7 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 110 nm as determined by a Brookhaven BI-90 particle sizer.

Example 21

The graft copolymer of Example 10 was neutralized using the following procedure: 55.6 g of the polymer were mixed with 10.2 g of potassium hydroxide solution (45.6% in deionized water) and 184.2 g of deionized water until a homogeneous 10% polymer solution was obtained. The pH of the polymer solution was 8.8.

The polymer solution, 250.0 g, was mixed with 60.0 g of FW18 carbon black (Degussa Corp., Allendale, N.J.) and 90.0 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 105 nm as determined by a Brookhaven BI-90 particle sizer.

Example 22

The graft copolymer of Example 11 was neutralized using the following procedure: 57.9 g of the polymer were mixed with 6.6 g of potassium hydroxide solution (45.6% in deionized water) and 185.5 g of deionized water until a homogeneous 10% polymer solution was obtained. The pH of the polymer solution was 8.6.

The polymer solution, 250.0 g, was mixed with 60.0 g of FW18 carbon black (Degussa Corp., Allendale, N.J.) and 90.0 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 106 nm as determined by a Brookhaven BI-90 particle sizer.

Example 23

The graft copolymer of Example 12 was neutralized using the following procedure: 56.8 g of the polymer were mixed with 7.2 g of potassium hydroxide solution (45.6% in deionized water) and 186.0 g of deionized water until a homogeneous 10% polymer solution was obtained. The pH of the polymer solution was 8.5.

The polymer solution, 250 g, was mixed with 60 g of FW18 carbon black (Degussa Corp., Allendale, N.J.) and 90.0 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 109 nm as determined by a Brookhaven BI-90 particle sizer.

Example 24

The graft copolymer of Example 13 was neutralized using the following procedure: 54.7 g of the polymer were mixed with 8.4 g of potassium hydroxide solution (45.6% in deionized water) and 186.9 g of deionized water until a homogeneous 10% polymer solution was obtained. The pH of the polymer solution was 8.6.

The polymer solution, 250.0 g, was mixed with 60.0 g of FW18 carbon black (Degussa Corp., Allendale, N.J.) and 90.0 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 105 nm as determined by a Brookhaven BI-90 particle sizer.

Comparative Example 6

The graft copolymer of Comparative Example 1 was neutralized using the following procedure: 92.4 g of the polymer were mixed with 20.2 g of potassium hydroxide solution (45.6% in deionized water) and 287.4 g of deionized water until a homogeneous 10% polymer solution was obtained. The pH of the polymer solution was 8.6.

The polymer solution, 186.0 g, was mixed with 44.6 g of FW18 carbon black (Degussa Corp., Allendale, N.J.) and 66.7 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 111 nm as determined by a Brookhaven BI-90 particle sizer.

Comparative Example 7

The graft copolymer of Comparative Example 2 was neutralized using the following procedure: 88.1 g of the polymer were mixed with 17.9 g of potassium hydroxide solution (45.6% in deionized water) and 294.0 g of deionized water until a homogeneous 10% polymer solution was obtained. The pH of the polymer solution was 9.0.

The polymer solution, 166.6 g, was mixed with 40.0 g of FW18 carbon black (Degussa Corp., Allendale, N.J.) and 60.0 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 111 nm as determined by a Brookhaven BI-90 particle sizer.

Comparative Example 8

The graft copolymer of Comparative Example 3 was neutralized using the following procedure: 45.2 g of the polymer were mixed with 8.5 g of potassium hydroxide solution (45.6% in deionized water) and 146.4 g of deionized water until a homogeneous 10% polymer solution was obtained. The pH of the polymer solution was 9.0.

The polymer solution, 166.7 g, was mixed with 40.0 g of FW18 carbon black (Degussa Corp., Allendale, N.J.) and 60.0 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 105 nm as determined by a Brookhaven BI-90 particle sizer.

Comparative Example 9

The graft copolymer of Comparative Example 4 was neutralized using the following procedure: 44.6 g of the polymer were mixed with 8.5 g of potassium hydroxide solution (45.6% in deionized water) and 146.9 g of deionized water until a homogeneous 10% polymer solution was obtained. The pH of the polymer solution was 8.8.

The polymer solution, 166.7 g, was mixed with 40.0 g of FW18 carbon black (Degussa Corp., Allendale, N.J.) and 60.0 g of deionized water and stirred mechanically for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 15% pigment concentration with an average particle size of 104 nm as determined by a Brookhaven BI-90 particle sizer.

Print Test

The pigment dispersion concentrates of Examples 14–23 and Comparative Examples 6–9 were mixed with a vehicle solution to give the following ink composition:

| INGREDIENT | AMOUNT (WT %) |
|---|---|
| Carbon Black, FW18 | 2.75 |
| Dispersant | 1.25[a] |
| 2-Pyrrolidone (Aldrich Chemical Co., Milwaukee, WI) | 5.0 |
| N-Methylpyrrolidone (Aldrich Chemical Co., Milwaukee, WI) | 2.0 |
| Liponic ® EG-1 (Lipo Chemicals Inc., Paterson, NJ.) | 4.25 |
| Zonyl ® FSA (DuPont Co., Wilmington, DE) | 0.05 |
| Proxel ® G (Zeneca Inc., Wilmington, DE) | 0.15 |
| Deionized water | 84.6 |

[a] The dispersant concentration for Examples 3 and 4 were 1.38% and 0.92%, respectively.

The inks were filled into a thermal ink jet pen and printed with a Hewlett Packard DeskJet ink jet printer (Hewlett Packard Co., Palo Alto, Calif.) on Gilbert bond paper (25% cotton, Mead Co., Dayton, Ohio). The ink stability was measured by the particle size change, delta nm, using the Brookhaven particle sizer BI-90 after the ink samples had been subjected to 4 temperature cycles, each consisting of 4 hours at −20° C. and 4 hours at 70° C. The results are summarized in Table 1.

TABLE 1

| Ink # | Dispersion # | Optical Density | T-cycle (Delta nm) |
|---|---|---|---|
| 25 | E14 | 1.37 | 0 |
| 26 | E15 | 1.54 | 0 |
| 27 | E16 | 1.46 | 2 |
| 28 | E17 | 1.54 | 2 |
| 29 | E18 | 1.46 | 3 |
| 30 | E19 | 1.43 | 0 |
| 31 | E20 | 1.48 | 0 |
| 32 | E21 | 1.52 | 4 |
| 33 | E22 | 1.56 | 0 |
| 34 | E23 | 1.52 | 1 |
| 35 | E24 | 1.52 | 1 |
| 36 | C6 | 1.45 | 0 |
| 37 | C7 | 1.43 | 9 |
| 38 | C8 | 1.48 | 49 |
| 39 | C9 | 1.46 | 64 |

All experimental inks, #25–35, printed smoothly. The prints had high to very high optical density and sharp edges. The print quality of Ink #38 and 39 using the dispersion of Comparative Examples 8 and 9 gradually deteriorated when printing 100% solid area. It became streaky and started to lose optical density.

All experimental inks, #25–35, were stable while 3 of the comparative examples showed significantly particle size growth after the temperature cycle test.

Stability Test

Dispersion stability against some commonly used organic cosolvents and surfactants in ink jet inks was determined by measuring the particle size change in delta nm on a Brookhaven BI-90 particle sizer after the ink samples had been subjected to 4 temperature cycles, each consisting of 4 hours at −20° C. and 4 hours at 70° C. The results are shown in Table 2 below.

TABLE 2

| Cosolvent/ Surfactant | Delta nm | | | | | | | | | | | | | | |
|---|---|---|---|---|---|---|---|---|---|---|---|---|---|---|---|
| | E14 | E15 | E16 | E17 | E18 | E19 | E20 | E21 | E22 | E23 | E24 | C6 | C7 | C8 | C9 |
| Cosolvents: | | | | | | | | | | | | | | | |
| Neopentyl glycol | 27 | 36 | 17 | 62 | F | 12 | 42 | 25 | 8 | 18 | 14 | 0 | 29 | 74 | F |
| 3,3-Dimethyl-1,2-butane-diol | 5 | 0 | 0 | 7 | 16 | 4 | 8 | 5 | 6 | 6 | 0 | 5 | 24 | 70 | 65 |
| 1,2,4-Butane triol | 7 | 0 | 0 | 7 | 1 | 33 | 0 | 15 | 0 | 0 | 2 | 0 | 0 | 7 | 11 |
| Dowanol ® TBH | 5 | 19 | 0 | 15 | F | F | F | 17 | 25 | 19 | 19 | 5 | F | F/S | F/S |
| Butyl carbitol | 2 | 0 | 18 | 9 | F | F | F | 21 | 8 | 19 | 20 | 17 | F | F/S | F/S |
| Liponic ® EG-1 | 0 | 0 | 0 | 12 | 0 | 0 | 0 | 8 | 0 | 0 | 0 | 0 | 0 | 8 | 6 |

TABLE 2-continued

| Cosolvent/ Surfactant | Delta nm | | | | | | | | | | | | | | |
|---|---|---|---|---|---|---|---|---|---|---|---|---|---|---|---|
| | E14 | E15 | E16 | E17 | E18 | E19 | E20 | E21 | E22 | E23 | E24 | C6 | C7 | C8 | C9 |
| N-acetyl ethanolamine | 5 | 26 | 14 | 90 | 5 | 0 | 0 | 30 | 30 | 10 | 33 | 0 | 65 | F | F/S |
| 1-Ethyl-2-pyrrolidone | 21 | 16 | 15 | 10 | 12 | 4 | 0 | 27 | 4 | 5 | 10 | 8 | 0 | F | F/S |
| 1,4-Cyclo-hexane dimethanol | 23 | 8 | 30 | 16 | 49 | 8 | 22 | 45 | 9 | 0 | 4 | 4 | 0 | F | 217 |
| Surfactants: | | | | | | | | | | | | | | | |
| Merpol ® SH | 29 | 45 | 24 | 56 | 0 | 6 | 9 | 31 | 26 | 31 | 30 | 4 | 69 | F | F |
| Aerosol ® MA-80/Aerosol ® OT (2/1) | 46 | 69 | 24 | 65 | 19 | 44 | 19 | 51 | 28 | 16 | 33 | 18 | 23 | 50 | 207 |
| Surfynol ® CT-136 | 2 | 0 | 0 | 10 | 6 | 2 | 15 | 5 | 5 | 12 | 12 | 9 | 0 | 62 | F |
| Surfynol ® 465 | 7 | 0 | 15 | 3 | 34 | 29 | 0 | 19 | 0 | F | 2 | 16 | 15 | 140 | F |
| Triton ® X-100 | 8 | 6 | 8 | 8 | 28 | 26 | 0 | 23 | 5 | 6 | 10 | 39 | 29 | F/S | F/S |
| Synthrapol ® KB | 10 | 25 | 0 | 9 | 67 | 77 | F | 32 | 8 | 4 | 4 | 63 | F/S | F/S | F/S |

Notes

Neopentyl glycol, 3,3-dimethyl-1,2-butanediol, 1,2,4-butanetriol, butyl carbitol, N-acetyl ethanolamine, 1-ethyl-2-pyrrolidone, 1,4-cyclohexanediol were obtained from Aldrich Chemical Co., Milwaukee, Wis. Dowanol® TBH was obtained from Dow Chemical, Midland, Mich. Liponic® EG-1 was obtained from Lipo Chemicals Inc., Paterson, N.J. Merpol® SH was obtained from E. I. Dupont Co., Wilmington, Del. Aerosol® MA-80 and OT were obtained from American Cyanamid Co., Wayne, N.J. Surfynol® CT-136 and 465 were obtained from Air Products and Chemicals, Inc., Allentown, Pa. Triton® X-100 was obtained from Rohm&Haas Co., Philadelphia, Pa. Synthrapol® KB was obtained from ICI Americas, Inc., Wilmington, Del.

Pigment concentration=5% by weight of the total weight

Cosolvents were tested at 8% (by weight) of the total liquid carrier medium.

Surfactants were tested at 3% (by weight) of the total liquid carrier medium.

F=Grossly flocculated, S=Phase separated with a clear liquid layer on top of the dispersion.

Based on this data, the dispersion stability or resistance to organic cosolvents and surfactants is significantly improved for polymer dispersants having aryl groups in the hydrophobic or pigment binding portion over the ones having alky groups only.

Example 36

Preparation of macromonomer, homopolymer of 2-phenoxyethyl methacrylate

| | Weight (GM) |
|---|---|
| Portion 1 | |
| Methyl ethyl ketone | 146.0 |
| Portion 2 | |
| 2-Phenoxyethyl methacrylate | 72.0 |
| Diaquabis (borondifluorodiphenyl glyoximato) cobaltate (II), CO(DPG-BF$_2$) | 0.054 |
| Methy ethyl ketone | 10.0 |
| Portion 3 | |
| 2,2'-azobis(2,2-dimethylvaleronitrile), (Vazo ® 52, by DU Pont Co., Wilmington, DE) | 0.32 |
| Methyl ethyl ketone | 12.6 |
| Portion 4 | |
| 2-Phenoxyethyl methacrylate | 288.0 |
| Portion 5 | |
| 2,2'-azobis(2,2-dimethylvaleronitrile), (Vazo ® 52. by Du Pont Co., Wilmington, DE) | 5.0 |
| Methyl ethyl ketone | 76.0 |
| Total | 610.0 |

The Portion 1 mixture was charged into a 3 liter flask equipped with a thermometer, stirrer, additional funnels, reflux condenser and a means of maintaining a nitrogen blanket over the reactants. The mixture was heated to the reflux temperature and refluxed for about 10 minutes. The Portion 2 solution was added over 2 minutes. Portion 3 was added over 15 minutes. The reaction mixture was refluxed for 10 minutes. Portions 4 and 5 were simultaneously added while the reaction mixture was held at the reflux temperature of about 85° C. The addition of Portion 4 was completed in 4 hours and the addition of Portion 5 was completed in 4.5 hours while the reaction mixture was held at the reflux temperature throughout the course of additions. Reflux was continued for another hour and the solution was cooled to room temperature.

The resulting macromonomer solution was a clear thin polymer solution and had a solids content of about 58.5%. The macromonomer had a weight average molecular weight of 2,090 and a number average molecular weight of 1,380 as measured by Gel Permeation Chromatography (GPC) using polymethyl methacrylate as the standard.

Example 37

This shows the preparation of a cationic graft copolymer, ethoxytriethyleneglycol methacrylate-co-N,N-dimethylaminoethyl acrylate-g-2-phenoxyethyl methacrylate, 9.1/45.5//45.4% by weight, from a macromonomer

| INGREDIENT | WEIGHT (GM) |
|---|---|
| Portion 1 | |
| Macromonomer of Example 36 | 83.3 |
| 2-Pyrrolidone | 25.0 |
| Portion 2 | |
| t-butyl peroxypivalate (Lupersol ® 11, Elf Atochem, North America, Inc., Philadelphia, PA) | 0.4 |
| Isopropanol | 5.0 |
| Portion 3 | |
| Ethoxytriethyleneglycol methacrylate | 10.0 |
| N,N-Dimethylaminoethyl acrylate | 50.0 |
| Portion 4 | |
| t-butyl peroxypivalate (Lupersol ® 11, Elf Atochem, North America, Inc., Philadelphia, PA) | 2.0 |
| Isopropanol | 20.0 |
| Portion 5 | |
| t-butyl peroxypivalate (Lupersol ® 11, Elf Atochem, North America, Inc., Philadelphia, PA) | 0.4 |
| Isopropanol | 5.0 |
| Total | 201.1 |

The Portion 1 mixture was charged into a 500 mL flask equipped with a thermometer, stirrer, additional funnels, reflux condenser and a means for maintaining a nitrogen blanket over the reaction mixture. The mixture was heated to the reflux temperature and refluxed for about 10 minutes. The Portion 2 solution was added. Subsequently, Portions 3 and 4 were simultaneously added while the reaction mixture was held at the reflux temperature. The addition of Portions 3 and 4 were completed in 3 hours. The reaction mixture was refluxed for 1 hour. The Portion 5 solution was added. The reaction mixture was refluxed for another hour. The mixture was distilled until about 54.0 g of volatiles were collected and 85.0 g of 2-pyrrolidone were added to yield 231.4.0 g of a 43.0% polymer solution. This graft copolymer contains a random copolymer of 9.1% by weight of ethoxytriethyleneglycol methacrylate and 45.4% by weight of N,N-dimethylaminoethyl acrylate in the backbone and a homopolymer of 45.4% by weight of 2-phenoxyethyl methacrylate in the arms.

Example 38

The graft copolymer of Example 37 was neutralized using the following procedure. 58.1 g of the polymer were mixed with 8.2 g of phosphoric acid solution (85% in deionized water) and 183.7 g of deionized water until a homogeneous 10% polymer solution was obtained. The pH of the polymer solution was 3.5.

The polymer solution was mixed with 50 g of FW18 carbon black (Degussa Corp., Allendale, N.J.) and 83.3 g of deionized water, and stirred mechanically for 0.5 hour. The mixture was then processed with a microfluidizer (Microfluidics Corp., Watham, Mass.) by passing it through the interaction chamber 5 times under a liquid pressure of about 7,000 psi. The resulting pigment dispersion had 15% pigment concentration with an average particle size of 108 nm as determined by Brookhaven BI-90 particle sizer.

Example 39

Print Test

The pigment dispersion concentrates of Example 38 was mixed with a vehicle solution to give the following ink composition.

| INGREDIENT | AMOUNT (WT %) |
|---|---|
| Carbon Black, FW18 | 3.00 |
| Dispersant | 1.50 |
| 2-Pyrrolidone (Aldrich Chemical Co., Milwaukee, WI) | 6.0 |
| Tetraethylene glycol | 10.0 |
| Multranol ® 4012 | 2.50 |
| Deionized water | 77.0 |

The ink was filled into a thermal ink jet pen and printed with a Hewlett Packard DeskJet ink jet printer (Hewlett Packard Co., Palo Alto, Calif.) on Gilbert bond paper (25% cotton, Mead Co., Dayton, Ohio). It printed very smoothly, dried rapidly, and gave an optical density of 0.91. The ink showed no particle size change after it had been subjected to 4 temperature cycles, each consisting of 4 hours at −20° C. and 4 hours at 70° C.

What is claimed is:

1. A process for making printed images, said process comprising the step of jetting an ink jet ink composition from an ink jet printer, said ink jet ink composition comprising:
   (a) an aqueous carrier medium,
   (b) an insoluble colorant, and
   (c) a salt of a graft copolymer dispersant that is soluble in the aqueous carrier medium, said dispersant having a backbone portion and at least one sidechain portion wherein:
      (i) both portions are prepared from ethylenically unsaturated monomers and the sidearm portion is hydrophilic and the backbone portion is hydrophobic;
      (ii) the ratio of the hydrophobic portion to the hydrophilic portion is in the range of 90:10 to 10:90 by weight; and
      (iii) the hydrophobic portion contains at least 50% by weight, based on the total weight of the hydrophobic portion, of at least one monomer selected from the group consisting of aryl esters of acrylic acid, aryl esters of methacrylic acid, N-aryl acrylamide, N-aryl methacrylamide and vinyl aryl esters.

2. The process of claim 1 wherein the hydrophobic portion is prepared from at least one monomer having the following formulae:

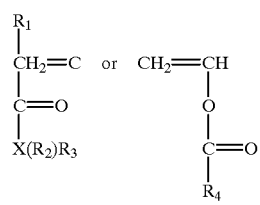

wherein $R_1$ is selected from the group of H and $CH_3$; X is selected from the group of N and O; when X is N, $R_2$ and $R_3$ may be independently selected from the group consisting of H, substituted alkyl, substituted aryl, substituted alkylaryl, unsubstituted alkyl, unsubstituted aryl and unsubstituted alkylaryl groups provided that either $R_2$ or $R_3$ contains at least one aryl or alkylaryl group; when X is O, $R_2$ does not exist and $R_3$ is selected from the group consisting of substituted aryl, substituted alkylaryl groups, unsubstituted aryl and unsubstituted alkylaryl groups; and $R_4$ is selected from the group consisting of substituted aryl, substituted alkylaryl groups, unsubstituted aryl and unsubstituted alkylaryl groups.

3. The process of claim 2 wherein the monomer is selected from the group consisting of phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, 1-naphthalyl acrylate, 2-naphthalyl acrylate, 2-naphthalyl methacrylate, p-nitrophenyl acrylate, p-nitrophenyl methacrylate, phthalimidomethyl acrylate, phthalimidomethyl methacrylate, N-phenyl acrylamide, N-phenyl methacrylamide, N-benzyl acrylamide, N-benzyl methacrylamide, N-(2-phenylethyl)acrylamide, N-(2-phthalimidoethoxymethyl)acrylamide, vinyl benzoate, and mixtures thereof.

4. The process claim 1 or 2 wherein the hydrophobic portion is prepared including one or more of the following monomers:
   (i) up to 20% by weight of a hydrophilic monomer;
   (ii) up to 30% by weight of a monomer having functional groups that bind to the pigment; and
   (iii) hydrophobic monomer that modifies physical properties of said graft copolymer;
wherein said weight percents are based on total weight of the graft copolymer.

5. The process of claim 4 wherein monomer (ii) has amine or acid groups.

6. The process of claim 2 wherein the hydrophilic portion is prepared by including 2 to 100% by weight of an ionizable monomer, based on total weight of the hydrophilic portion.

7. The process of claim 6 wherein the graft copolymer dispersant is anionic and the ionizable monomer contains acid or acid precursor groups.

8. The process of claim 7 wherein the monomer is selected from the group consisting of acrylic acid, methacrylic acid, crotonic acid, itaconic acid, itaconic acid monoester, maleic acid, maleic acid monoester, fumaric acid and fumaric acid monoester.

9. The process of claim 7 wherein the anionic graft copolymer is neutralized with alkali metal hydroxides, alkali metal carbonates, alkali metal bicarbonate, organic amines, organic alcohol amines, ammonium salts, and pyridine.

10. A process for making printed images, said process comprising the step of jetting an ink jet ink composition from an ink jet printer, said ink jet ink composition comprising:
    (a) an aqueous carrier medium,
    (b) an insoluble colorant, and
    (c) a salt of a graft copolymer dispersant that is soluble in the aqueous carrier medium, said dispersant having a backbone portion and at least one sidechain portion wherein:
        (i) both portions are prepared from ethylenically unsaturated monomers and one portion is hydrophilic and the other portion is hydrophobic;
        (ii) the ratio of the hydrophobic portion to the hydrophilic portion is in the range of 90:10 to 10:90 by weight; and
        (iii) the hydrophobic portion contains at least 50% by weight, based on the total weight of the hydrophobic portion, of at least one monomer selected from the group consisting of aryl esters of acrylic acid, aryl esters of methacrylic acid, N-aryl acrylamide, N-aryl methacrylamide and vinyl aryl esters;
    wherein the graft copolymer dispersant is cationic and the hydrophilic portion comprises 2–100% by weight of an ionizable monomer that contains amine groups.

11. The process of claim 10 wherein the cationic graft copolymer is neutralized with an organic or inorganic acid.

12. The process of claim 11 wherein the acid is selected from the group consisting of acetic acid, propionic acid, formic acid, oxalic acid, hydroxylated acids, halogenated acids, sulfuric acid, phosphoric acid, and nitric acid.

13. The process of claim 1 wherein said graft copolymer is prepared including a non-ionic hydrophilic or water soluble monomer having the formula

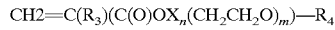

$$CH2=C(R_3)(C(O)OX_n(CH_2CH_2O)_m)-R_4$$

wherein n is 0 or 1; when n is 1, X is an alkyl, aryl, or alkylaryl diradical connecting group of 1 to 9 carbon atoms; m is 1 to 100; $R_3$ is H or $CH_3$; and $R_4$ is selected from the group consisting of H and alkyl groups of 1 to 4 carbon atoms.

14. The process of claim 13 wherein the monomer is selected from the group consisting of 2-hydroxyethyl acrylate, 2-hydroxyethyl methacrylate, hydroxypropyl acrylate, 2-(2-methoxyethoxy)ethyl acrylate, 2-(2-methoxyethoxy)ethyl methacrylate, ethoxytriethyleneglycol methacrylate, methoxy polyethyleneglycol monomethacrylate and polyethyleneglycol monomethacrylate.

15. The process of claim 1 wherein the aqueous carrier medium is present in the amount of 70 to 99.8%, the pigment is present in the amount of 1 to 30%, and the graft copolymer dispersant is present in the amount of 0.1 to 30%, based on the total weight of the ink.

16. The process of claim 15 wherein said graft copolymer has a weight average molecular weight in the range of 5,000 to 50,000; and the ratio of the hydrophobic portion to the hydrophilic portion of said graft copolymer is in the range of 80:20 to 50:50 by weight.

* * * * *